United States Patent                                                                 [11] 3,628,287

| [72] | Inventors | Emil John Staba<br>Minneapolis, Minn.;<br>Balkrishena Kaul, Jersey City, N.J. |
|---|---|---|
| [21] | Appl. No. | 867,894 |
| [22] | Filed | Oct. 20, 1969 |
| [45] | Patented | Dec. 21, 1971 |
| [73] | Assignee | The United States of America as represented by the Secretary of the Department of Health, Education and Welfare<br>Continuation-in-part of application Ser. No. 740,076, June 26, 1968, now abandoned. This application Oct. 20, 1969, Ser. No. 867,894 |

[54] PRODUCTION OF DIOSGENIN BY PLANT TISSUE CULTURE TECHNIQUE
8 Claims, No Drawings

[52] U.S. Cl. .................................................... 47/58,
    71/117, 71/116, 71/122, 260/239.55
[51] Int. Cl. ..................................................... A01g 31/00,
    A01n 9/24, C12k 9/00, C07c 173/00
[50] Field of Search ........................................ 260/239.55;
    47/58

[56]                  References Cited
             UNITED STATES PATENTS
2,747,334   5/1956   Routien et al. ................     47/58
2,774,714  12/1956   Hershberg et al............. 260/239.55 X OTHER REFERENCES
  Steroidal Sapogenins XLIII, JAPA XLVI, No. 11, pp. 653 and 664 relied on
  Steroidal Sapogenins LV, JAPA XLVIII, No. 12, pg. 695 relied on
  Plant Tissue Culture; Carew and Staba; Lloydia, Vol. 28, No. 1, Mar. 1965, pp. 3–14 relied on

*Primary Examiner*—Robert E. Bagwill
*Attorney*—Norman J. Latker

ABSTRACT: A method for growing callus or undifferentiated tissue cultures of *Dioscorea* seeds and other plant parts under aseptic conditions thus producing diosgenin which is recovered and may be used in the production of corticosteroids, hormones, anabolics and related steroid derivatives.

PRODUCTION OF DIOSGENIN BY PLANT TISSUE CULTURE TECHNIQUE

This application is a continuation-in-part of application Ser. No. 740,076, now abandoned, which was filed June 26, 1968.

With the increasing utilization of oral cortisone compounds such as Prednisone in the treatment of arthritis and most recently in the impact of the utilization of steroids as oral contraceptives, the pharmaceutical industry has become interested in broadening the base of possible precursors looking not only to the synthetics, but to steroid precursors from natural products such as *Dioscorea*, also known as Wild Yam, Mexican Yam and Barbasco Root. In contrast to the recovery and extraction of diosgenin from the plants themselves, in which case diosgenin recovery averages about 2 percent from selected portions of the plant, the present invention envisages a novel technique of actual production of diosgenin for growing tissue cultures of *Dioscorea* species, thus producing diosgenin in situ in an aseptic milieu. Characteristic of this type of procedure, undifferentiated tissues were used exclusively since differentiated tissue contained only trace amounts of diosgenin (see table 2) and aseptic techniques were used until the cells were harvested. The undifferentiated cell growth is characterized by the fact that most of the cells present are the same or closely related in structure and function, or in other words, it is a kind of embryonic-type cell growth or uninterrupted regeneration.

The present invention also includes the discovery that the addition of a minor amount of cholesterol to the tissue culture may bring about a substantial increase in the yield of diosgenin. For example, as little as 0.005 percent cholesterol by a biotransference mechanism has resulted in increased diosgenin production.

The prior patent art related to this type of procedure is sparse. U.S. Pat. No. 2,747,334, Routien et al. provides a generalized forecast of things to come in the medicinal plant tissue suspension systems, but lacks a teaching of guidelines directed to the present elucidation of diosgenin.

Tissue cultures of callus obtained from seeds of various *Dioscorea* species have been established, including the preferred *D. deltoidea* as well as *D. composita, D. spiculiflora and D. floribunda*. *D. deltoidea* tissue cultures have been found to yield diosgenin in amounts far in excess of the amounts obtained from tissue cultures of the other *Dioscorea* species. This is illustrated by table 3.

SUMMARY OF INVENTION

Seedlings of *Dioscorea* species were aseptically germinated according to the method of Kaul and Staba, Panta Med. 15. 145–146 (1967), and the *Dioscorea* seedlings were transferred to a revised Murashige's and Skoog's Tobacco (RT) medium containing 1 p.p.m. 2,4-dichlorophenoxyacetic acid (2.4-D) and 1 percent agar contained in 1-oz. clear glass square vials. It was noted that callus tissue was initiated in 4–6 weeks. The callus tissue served as stock cultures and these were transferred to the liquid RT medium without agar and 0.1 p.p.m. 2,4-D to obtain suspension cultures. Callus and/or suspension cells were dried and acid hydrolyzed to obtain the free steroids that were present as glycosides. Subsequently the cells were extracted with either chloroform of a BTX-type solvent (benzene, toluene, xylene), and diosgenin was quantitated by vapor phase chromatography and recovered by preparative thin-layer chromatography. Undifferentiated tissues were used exclusively and the aseptic technique was preserved until the cells were harvested. The cells analyzed were 3–4 weeks old from the time they were transferred into the fresh medium and this contrasted with about 2 years for tubers in the field. Moreover, the system can be operative all year round under ordinary room temperature (22°–29° C.) and light conditions using aseptic techniques.

Recovery of diosgenin from field tubers is about 2 percent. Recovery of diosgenin from tissue cultures of *D. deltoidea* have averaged about 1 percent, but the availability factors noted above will cut down any disadvantageous cost comparison substantially. Precursors such as cholesterol added to the tissue culture system will cut down the theoretical advantage of the tuber technique and, in addition, strains of *Dioscorea* species will undoubtedly be discovered which will produce diosgenin in amounts comparable to or even superior to the tuber technique.

The present invention in the pharmaceutical field highlights a novel breakthrough of a commercially useful pharmaceutical product produced by a plant tissue culture system. At present, all the economic demand for diosgenin obtained from tubers of *Dioscorea* is obtained by importation from Mexico and other countries. The supplies of the tuberous material are decreasing and the demand is increasing. It is believed that the present tissue culture system for the production of diosgenin may prove competitive to that obtained from the plant both in cost and time basis, and the present invention may give increased yields of diosgenin by possible improvements in the nutrient medium by incorporation of cholesterol and other precursors of diosgenin as well as strain selection.

EXAMPLE I

Source of plant material.

*D. deltiodea* is a native to the Himalaya Mountains of India Pakistan and China. The seeds of this species which were cultured were obtained from the Regional Research Laboratory, Jammu and Kashmir India where living plants of *D. deltiodea* are cultivated and maintained. Seeds of *D. composita, D. spiculiflora* and *D. floribunda*, were obtained from h the United States Department of Agriculture in Florida and Puerto Rico. In all cases, the seeds from which the tissue cultures were prepared were from a number of plants of each species rather than from a single plant.

Tissue culture and preparation of media.

Seeds of *Dioscorea* species were surface sterilized in 2.62 percent sodium hypochlorite solution for 20 minutes and germinated according to the technique of Kaul and Staba, previously reported, supra. The germinated seedlings were transferred to 1-oz. clear glass square vials containing revised Murashige's and Skoog's tobacco medium (RT), 1 percent agar, and 1 p.p.m. 2,4-dichlorophenoxyacetic acid (2,4-D). Grayish-white to pale brown callus tissue was formed from the entire seedling within 314 4 weeks and subcultured to fresh RT agar medium every 4–6 weeks. The callus tissues were transferred to 100 ml. of liquid RT medium in 500ml. Erlenmeyer flasks and established as suspension cultures. These flasks were agitated on a reciprocal shaker (80 strokes/min.; 5 cm. in length) and grown under ordinary room light conditions. The dispersed suspension cells were subcultured to fresh medium every 314 4 weeks. These cultures were grayish-white to brownish-yellow initially, but gradually formed a fine pale white friable suspension.

Extraction.

The dried cells were refluxed for 4 hours in hydrochloric acid (30 percent v./v.). The acid hydrolized cells were filtered and the cells washed with cold water until the filtrate pH was approximately 7. The washed cells were again dried at 80° C. for 16 hours followed by 100° C. for 1 hour and extracted with benzene for thin-layer chromatography, and with chloroform for vapor phase chromatography.

The product was analyzed by thin-layer chromatography, vapor phase chromatography, mixed melting point and IR measurements. Each method of analysis showed positively the presence of diosgenin. Probably not every seed of *D. deltoidea* will produce a tissue culture which will yield diosgenin in commercially practical amounts, but results to data indicate that the vast majority will. Tissue cultures of this species have unexpectedly consistently produced diosgenin in amounts far in excess of that obtained from tissue cultures of other *Dioscorea* species. It has been noted that tissue cultures of different strains of the same species produce tissue cultures which yield varying amounts of diosgenin. The diosgenin production of an established tissue culture, however, remains relatively constant. It appears likely, therefore, that by careful selection of strains of *D. composita, D. spiculiflora, D. floribunda*, etc. one will be found which will produce tissue cultures that will yield diosgenin in commercially significant amounts.

TABLE 1

REVISED TOBACCO MEDIUM (RT MEDIUM)

| | |
|---|---|
| m-Inositol | 5.0 g. |
| Sucrose | 30.0 g. |
| Iron Stock Solution | 5.0 ml. |
| Vitamin Stock Solution | 10.0 ml. |
| Inorganic Stock Solution | 100.0 ml. |
| Growth Regulator-2,4-D | 0.1 mg.(liquid medium) |
| | 1.0 mg.(agar medium) |
| Agar (if present) | 10.0 g. |
| Double Distilled Water to | 1.0 l. |
| pH: 6.0 before autoclaving at 250° C. for 30 minutes, adjusted with either KOH(3%) or HCl (1%). | |

| Inorganic Stock Solution | | Vitamin Stock Solution | |
|---|---|---|---|
| (Murashige and Skoog: Physiol. Plant. 15: 473-497, 1962) | | | |
| | g./2l. | | mg./l. |
| $MgSO_4·7H_2O$ | 7.400 | Cyanocobalamin | 0.15 |
| $MnSO_4·H_2O$ | 0.338 | Folic Acid | 50.00 |
| $ZnSO_4·7H_2O$ | 0.212 | Riboflavin | 50.00 |
| | | Biotin | 100.00 |
| $KNO_3$ | 38.000 | Choline Chloride | 100.00 |
| $NH_4NO_3$ | 33.000 | Ca-Pantothenate | 100.00 |
| | | Pyridoxine $PO_4$ | 100.00 |
| $CaCl_2·H_2O$ | 8.800 | Thiamine HCl | 100.00 |
| $KH_2PO_4$ | 3.400 | Nicotinamide | 200.00 |
| $H_3BO_3$ | 0.124 | | |
| KI | 0.017 | Iron Stock Solution | |
| | | | g./l. |
| $CuSO_4·H_2O$ | 0.0005 | $FeSO_4·7H_2O$ | 5.57 |
| $Na_2MoO_4·2H_2O$ | 0.005 | $Na_2$-Ethylonediamino- | |
| $CoCl_2·H_2O$ | 0.0005 | tetraacetate | 7.45 |

TABLE 2

DIOSGENIN CONTENT OF D. DELTOIDEA WALL. TISSUE CULTURES[a]

| Culture[b] | Age (wk.) | Wet wt. (g.) | Dry wt. (g.) | Percent Diosgenin (on dry wt. basis) |
|---|---|---|---|---|
| Callus—F | 8 | 110 | 13.33 | 1.01 |
| Callus—NF | 8 | 110 | 12.95 | 1.01 |
| Callus—D | 8 | 110 | 14.28 | Traces |
| Suspension—F | 3-4 | 110 | 14.06 | 0.95 |
| Suspension—NF | 3-4 | 110 | 15.13 | 1.02 |
| Suspension—D | 3-4 | 110 | 15.45 | Traces |

[a] Analyzed by gas chromatography.

[b] F—Fermented tissue; NF—Nonfermented; D—Differentiated (organized).

TABLE 3

DIOSCOREA TISSUE CULTURES: DIOSGENIN CONTENT AND GROWTH INDEX

| SPECIES | Callus Diosgenin Content* | G.I.** | Suspension Diosgenin Content* | G.I.** |
|---|---|---|---|---|
| D. deltiodea-Strain II | 348.5 | 3.1 | 23.7 | 1.9 |
| D. floribunda-Undiff. | 145.0 | 3.6 | 63.5 | 2.8 |
| D. floribunda-Diff. | 94.5 | 3.0 | 65.0 | 2.2 |
| D. spiculiflora | 90.4 | 2.8 | 35.3 | 1.8 |
| D. composita-Strain I | 60.2 | 3.2 | 38.1 | 2.5 |
| D. composita-Strain II | 24.5 | 2.4 | 50.9 | 1.7 |

*Diosgenin content expressed as mg.% dry weight of 4-week old callus tissue or 3-week old first generation suspension tissue.

**Growth Index (G.I.) = Final Dry Weight/Initial Dry Weight

EXAMPLE II

Tissue cultures were prepared in the same manner as in example I except the callus e starting material was obtained from the stem portion of seedlings (hypocotyl) rather than callus obtained from the entire germinated seedling. The resulting tissue cultures were extracted according to the method of example I and were found to produce diosgenin. It is apparent that tall portions of the plant can be cultured to produce diosgenin in commercially practical amounts by proper selection. This includes tissue cultures obtained from the entire seedling an d from preferred portions of the seedling such as leaves, stems, apical meristems, roots, etc. Also, it should be emphasized that once a tissue culture has been established the culture can be maintained indefinitely and it is not necessary to start over with new strating materials each time a new culture is established. Thus, a strain which is found to produce diosgenin in large amounts can be proliferated infinitely.

EXAMPLE III

Initial feeding with cholesterol.

To determine the effect of cholesterol of diosgenin production tissue cultures RT medium was prepared in the same manner as in example I except that the nutrient medium contained cholesterol. Cultures were prepared in which the nutrient RT medium contained 10, 50 and 100 mg. of cholesterol per 100 ml. of nutrient medium. The culture medium was inoculated with a 2-week-old undifferentiated cell suspension and incubated normally. The diosgenin-producing cells were harvested on the 21st and 42nd day after inoculation and the results thus obtained were compared with control cultures grown in RT medium without cholesterol. In all cases the diosgenin production was lower in the cultures with cholesterol than in the cultures without cholesterol.

EXAMPLE IV

"Pulse" feeding with cholesterol.

Tissue cultures were prepared in the same manner as in example I. On the 10the day after the vials were inoculated the entire culture from each vial was poured into a preautoclaved flask containing an aqueous suspension of cholesterol in amounts predetermined to produce a desired final cholesterol concentration. In this manner, cultures containing 10, 50 and 100 mg. of cholesterol per 100 ml. of liquid RT medium were obtained. The cultures were then incubated normally and the cells harvested on the 21st and 42nd day after the initial inoculation. The cholesterol was found to have a stimulating effect on diosgenin production with the amount produced varying directly with cholesterol concentration. A substantial increase in growth (6.3 percent increase) and in diosgenin production (65.8 percent increase) was obtained with *D. deltoidea* undifferentiated cells "pulse" fed with 100 mg. of cholesterol per 100 ml. of liquid RT medium when harvested on the 21st day of culture growth. Cells similarly fed with cholesterol and harvested on the 42nd day after initial inoculation produced even greater amounts of diosgenin. The significant difference in apparent utilization of cholesterol between "initial" and "puls" feeding may be explained on the basis of more actively growing and greater numbers of cells present in the latter case. The "initially" fed cells are in the lag phase of growth and in much fewer numbers. The enzyme systems of the cells in the "pulse" feeding stage would be correspondingly more active, thus giving a better bioconversion and utilization of cholesterol into diosgenin and related steroids.

Although the preferred medium, Murashige's and Skoog's Tobacco medium, and the 2,4-D growth promoter have given optimum results, other well-known media may be utilized such as White's medium containing coconut milk and other growth promoters such as p-chlorophenoxyacetic acid produce satisfactory results.

We claim:

1. A process for recovering diosgenin from undifferentiated suspension cultures of *Dioscorea* species which comprises aseptically growing undifferentiated cells derived from callus tissue of said species under tissue culture growth conditions in a nutrient aqueous medium and separating diosgenin from said cells.

2. Claim 1 wherein said *Dioscorea* species is *Dioscorea deltiodea*.

3. Claim 1 wherein said callus tissue is seed callus.

4. Claim 1 wherein said nutrient medium also contains growth-stimulating amounts of a growth-promoting agent.

5. Claim 4 wherein said growth promoting agent is 2.4-D.

6. Claim 1 wherein cholesterol is added aseptically to said nutrient medium in sufficient amount to produce a final cholesterol concentration of at least 0.005 percent.

7. Claim 1 wherein said undifferentiated cells are "pulse" fed with cholesterol by adding sufficient amounts of cholesterol to said nutrient medium approximately 10 after the start of undifferentiated cell culture to produce an increase in diosgenin production.

8. Claim 7 wherein the amount of cholesterol added to said nutrient medium is sufficient to produce a final cholesterol concentration of 10–100 mg. per 100 ml. of nutrient medium.

* * * * *